(12) United States Patent
Yamamoto

(10) Patent No.: US 6,697,327 B1
(45) Date of Patent: Feb. 24, 2004

(54) ATM SWITCHING SYSTEM

(75) Inventor: Toru Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/546,605

(22) Filed: Apr. 10, 2000

(30) Foreign Application Priority Data

Apr. 23, 1999 (JP) .......................................... 11/117246

(51) Int. Cl.⁷ ............................................. H04L 12/26
(52) U.S. Cl. ...................................... 370/220; 370/244
(58) Field of Search ................................ 370/217, 218, 370/219, 220, 244, 395.1, 395.21, 395.42, 395.43, 395.7, 395.71, 395.72, 409, 428, 429

(56) References Cited

U.S. PATENT DOCUMENTS

| | | | | |
|---|---|---|---|---|
| 5,278,969 A | * | 1/1994 | Pashan et al. | 370/244 |
| 5,398,235 A | * | 3/1995 | Tsuzuki et al. | 370/219 |
| 5,436,886 A | * | 7/1995 | McGill | 370/219 |
| 5,737,338 A | * | 4/1998 | Eguchi et al. | 370/244 |
| 5,870,382 A | * | 2/1999 | Tounai et al. | 370/220 |
| 6,269,077 B1 | * | 7/2001 | Matsumura et al. | 370/218 |
| 6,490,282 B1 | * | 12/2002 | Ikematsu | 370/395.1 |

FOREIGN PATENT DOCUMENTS

| | | |
|---|---|---|
| EP | 0 888 027 A2 | 12/1998 |
| JP | 06-216928 | 8/1994 |
| JP | 10-190683 | 7/1998 |
| JP | 11-261598 | 9/1999 |
| JP | 11-331193 | 11/1999 |
| WO | WO 98/26611 | 6/1998 |

* cited by examiner

*Primary Examiner*—Chi Pham
*Assistant Examiner*—Anh-Vu H Ly
(74) *Attorney, Agent, or Firm*—Whitham, Curtis & Christofferson, PC

(57) ABSTRACT

An ATM (Asynchronous Transfer Mode) switching system which enables processing of system switching to be implemented in short time while maintaining prescribed service quality on the occasion of system switching. There is provided a delay priority selector for reading-out to be outputted the cell with high delay priority from respective cells temporal storage device under control of a system switching controller. The delay priority selector performs read-out of the cell from the cell temporal storage device of stand-by system on the occasion of system switching. After the condition where there becomes none of storage of the cell whose delay priority is higher than that of the cell stored in the cell temporal storage device of the active system in the cell temporal storage device of the stand-by system, it causes the cell to be outputted from the cell temporal storage device of the active system to the delay priority selector.

7 Claims, 7 Drawing Sheets

DELAY PRIORITY : a>b
ABOLITION PRIORITY : X>Y
☐ ATM CELL

ATM SWITCHING SYSTEM

BACKGROUND OF THE INVENTION

The present invention relates to an ATM (Asynchronous Transfer Mode) switching system which is used for the sake of communication of the cell while multiplexing the cell efficiently.

DESCRIPTION OF THE PRIOR ART

Figure 1:
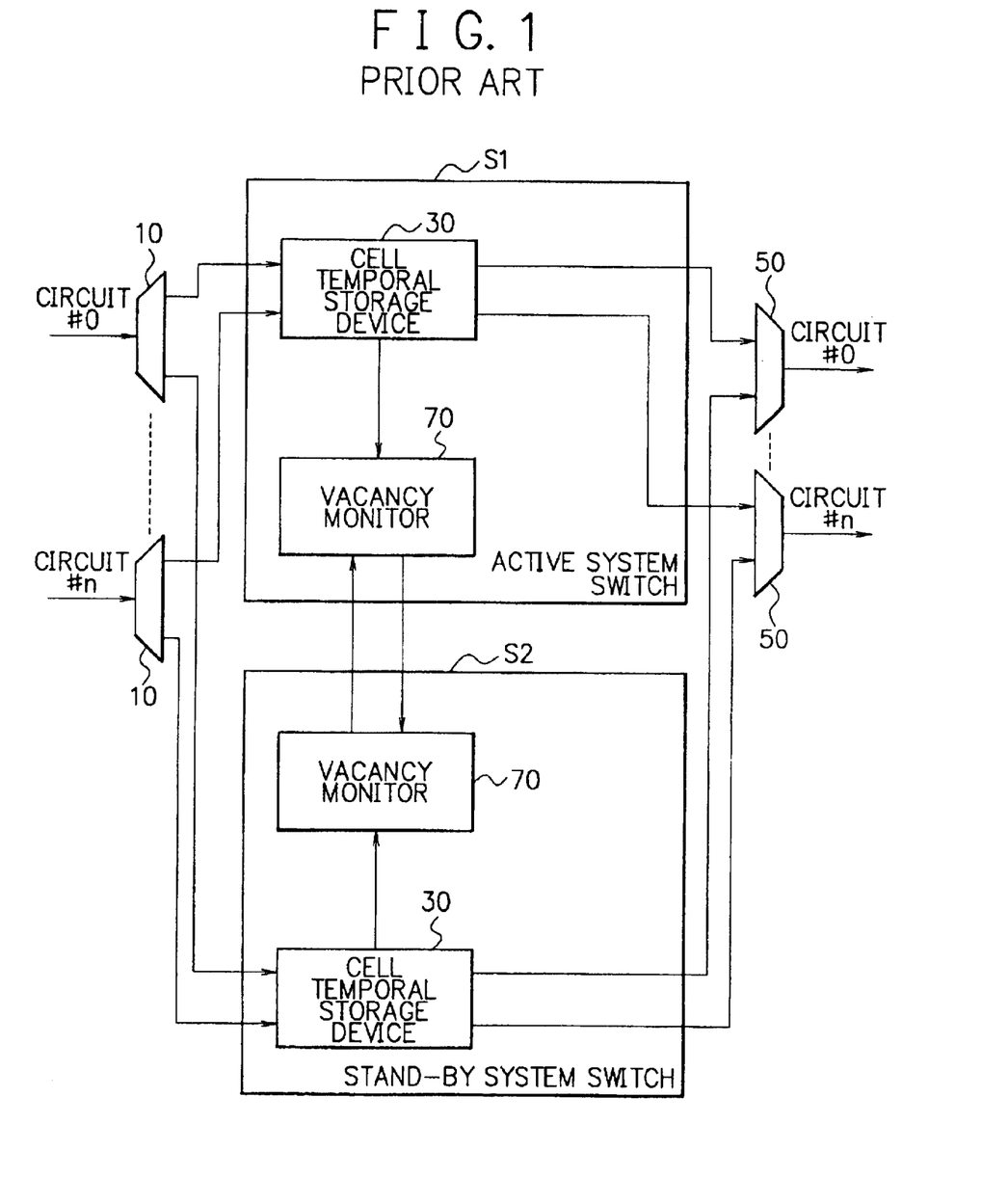
FIG. 1 is a block diagram showing a conventional ATM switching system.

FIG. 1 shows a conventional ATM (Asynchronous Transfer Mode) switching system. According to the conventional ATM switching system, it causes the system of an active system switch S1 (current application system) to be switched to a stand-by system switch S2 (subsequent application system) in accordance with the instruction of the microprocessor which is not illustrated. The microprocessor causes an input selector 10 connected to a circuit to execute switching such that only the input cell for respective switches S1, and S2 is switched to the subsequent application system. The stand-by system switch S2 stores therein the input cell while stopping output operation temporarily until when the whole cells are sent out from the inside of the cell temporal storage device 30 on the inside of the active system switch S1. Avacancy monitor 70 monitors the inside of the cell temporal storage device 30. A result of the monitoring according to the vacancy monitor 70 informs that there is vacant port. According to the monitoring result, an output operation of the stand-by system is permitted in order of the port whose cell temporal storage device 30 of the active system becomes vacant. Simultaneously, the output selector 50 in the output side executes switching, thus causing the output cell from the stand-by system to be transmitted to the circuit.

Further, the cell temporal storage device 30 of the output ports of the active system becomes vacant, before the output operation of the cell is commenced from the output ports of the stand-by system. On this occasion, sequence of the system switching ends, thus returning to stationary operation. According to these operations, switching becomes possible without loss of the cell even though the duplicate switches are switched.

Figure 2:
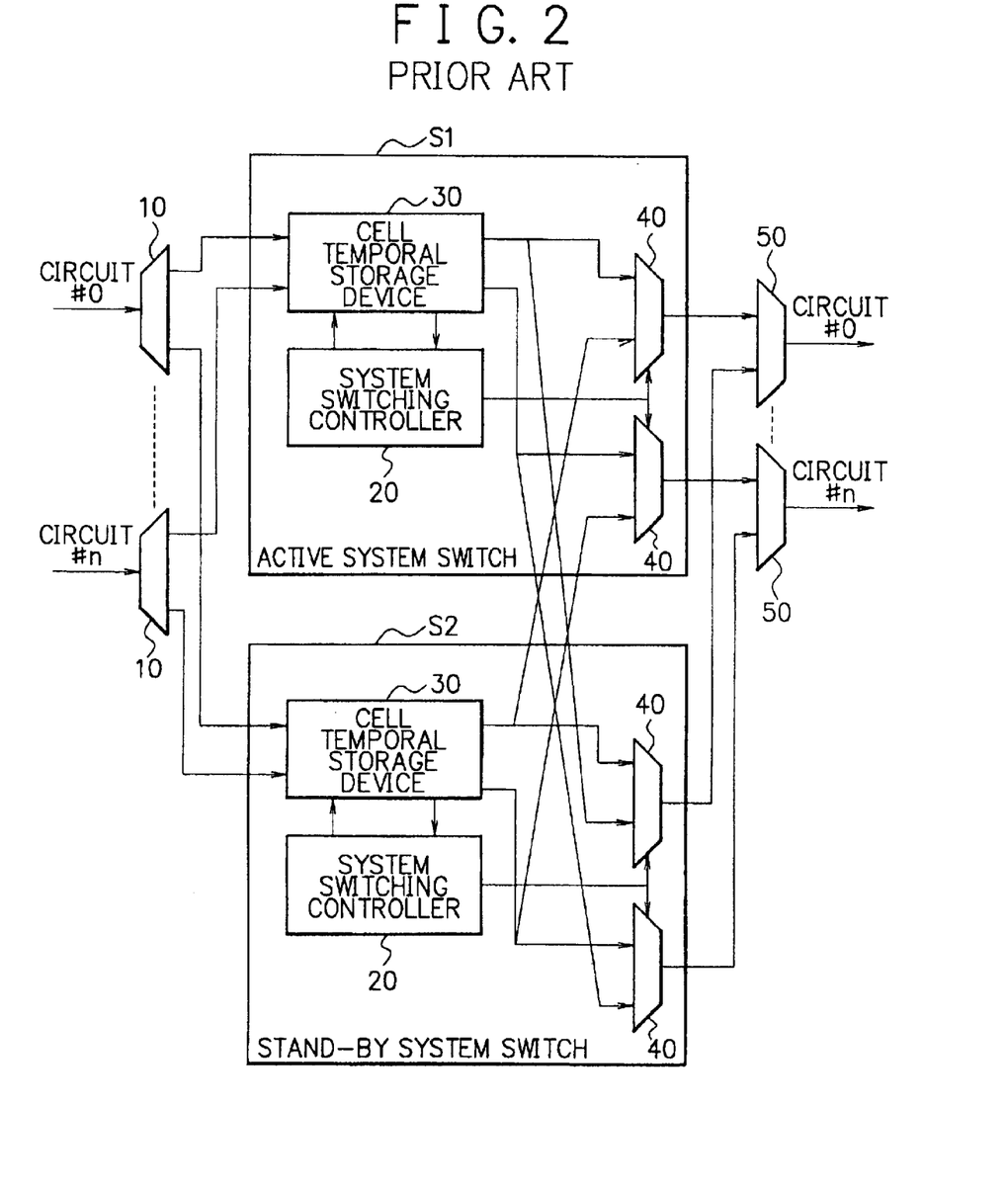
FIG. 2 is a block diagram showing another conventional ATM switching system.

On the other hand, in order to maintain quality of delay priority of respective cells, as shown in FIG. 2, a delay priority selector 40 is introduced so as to add the delay priority selector 40 to the constitution of FIG. 1. There is provided a system switching controller 20 instead of the vacancy monitor 70. At the time of switching of the system, it causes the cell to be read in order of height of delay priority from among the cells stored in both of the temporal storage devices of the active system and the stand-by system. Such a switching system is disclosed in the official report of the Japanese Patent Application Laid-Open No. HEI 11-17696. Furthermore, ITU-T recommendation or the document of The ATM Forum defines both characteristics of the above delay priority and abolition priority by using term Quality of Service (hereinafter referred to as "QoS").

However, in the conventional ATM switching system, various kinds of problems occur. Under normal conditions, when there is none of storage of the cell at all within the cell temporal storage device 30, it is possible to execute switching without problems. While when there is a little storage of the cell, even though quantity thereof is very little, within the cell temporal storage device 30, the following problem occurs. For instance, according to the invention described in the official report of the Japanese Patent Application Laid-Open No. HEI 6-6372, the cell with low delay priority is stored in the active system. Subsequently, the cell with high delay priority flows therein. On this occasion, switching of the system is implemented. In this case, the whole cells within the cell temporal storage device 30 of the active system flows out therefrom completely, before it causes the cell to flow out successively from the cell temporal storage device 30 of the stand-by system. Supposing that operation is confined at the time of system switching, the delay priority is disregarded. The cell of the cell temporal storage device of the active switching system is sure to flow out on the occasion of the system switching. As a result thereof, even though there exists a cell with high delay priority, passage delay of the high-priority cell becomes large on the inside of the ATM switch, and thus, there is the problem that delay quality deteriorates.

Furthermore, according to the invention of the Japanese Patent Application laid-Open No. HEI 11-17696, the cell with high delay priority is always outputted while giving the cell priority during system switching. For that reason, the cell with low delay priority becomes difficult to be read-out from the cell temporal storage device 30 of the active system. Further, unless the whole cells are outputted, which cells are stored in the cell temporal storage device 30 of the active system, the system switching is not completed. Thus, there is the problem that the time required for system switching increases. Namely, the cell of the traffic class (for instance CBR: Constant Bit Rate) whose outgoing destination is settled beforehand in regard to bandwidth to be used occupies this bandwidth of the circuit fully. On this occasion, the cell of the traffic class (for instance ABR: Address Base Resistor or VBR: Variable Bit Rate) is not outputted, whose bandwidth reservation is not performed beforehand in regard to outgoing destination, and is stored in the cell temporal storage device 30 of the active system. Thus, the system switching is not completed. Consequently, forced switching according to timeout of the software is executed. As a result, there is the problem that abolition of the cell of the ABR traffic with high abolition priority occurs.

SUMMARY OF THE INVENTION

In view of the foregoing it is an object of the present invention, in order to overcome the above-mentioned problems, to provide an ATM switching system which enables processing of system switching to be executed in a short time according to duplicate switches while maintaining prescribed service quality on the occasion of system switching.

According to a first aspect of the present invention, in order to achieve the above-mentioned object, there is provided an ATM (Asynchronous Transfer Mode) switching system which comprises an input selector for dividing cell inputted from a circuit between an active system switch and a stand-by system switch, a system switching controller which is provided for the active system switch and the stand-by system switch respectively in order to execute control of system switching, a cell temporal storage device which is provided for the active system switch and the stand-by system switch respectively for storing temporarily therein the inputted cell in every service quality class or in every outgoing destination, a delay priority selector for reading-out the cell with high delay priority successively to output from the respective cell temporal storage device under control of the system switching controller, and an output selector for outputting the cell of the delay priority selector to circuit, wherein the ATM switching system causes output of the cell to be executed for the sake of the delay priority selector from the cell temporal storage device of active system after condition that there becomes none of the cell whose delay priority is higher than that of the cell stored in the active system according to read-out control of the cell from the cell temporal storage device of stand-by system on the occasion of the system switching.

According to a second aspect of the present invention, in the first aspect, there is provided an ATM switching system, wherein it causes the cell of class of low abolition priority stored in the cell temporal storage device of the active system to be abolished after elapsing fixed time from commencement of system switching in the condition that the cell with low delay priority is stored in the cell temporal storage device of the active system.

According to a third aspect of the present invention, in the first aspect, there is provided an ATM switching system, wherein the system switching controller comprises a cell management part for instructing read-out of the cell whose delay priority is the highest delay priority among the cell stored in the cell temporal storage device of self-system and/or another system, a selector controller for controlling the delay priority selector so as to select the cell from either the self-system cell temporal storage device or another system cell temporal storage device, an another system communication part for implementing coordination so that it causes a cell of delay class to be stored in the self-system cell temporal storage device and the another system cell temporal storage device, and that it causes read-out of the cell of delay class to be implemented, and a timer for instructing abolition of the cell of lower class of cell abolition priority with regard to the cell temporal storage device after an elapsed fixed time from commencement of the system switching.

According to a fourth aspect of the present invention, in the first aspect, there is provided an ATM switching system, wherein the system switching controller comprises a cell management part for instructing read-out of the cell whose delay priority is the most highest delay priority among the cell stored in the cell temporal storage device of self-system and/or another system, a selector controller for controlling the delay priority selector so as to select the cell from either self-system cell temporal storage device or another system cell temporal storage device, an another system communication part for implementing coordination that it causes which cell of delay class to be stored in the self-system cell temporal storage device and the another system cell temporal storage device, and that it causes read-out of which cell of delay class to be implemented, and a timer for instructing abolition of the cell of lower class of cell abolition priority with regard to the cell temporal storage device after elapsing fixed time from commencement of the system switching.

According to a fifth aspect of the present invention, in the third aspect, there is provided an ATM switching system, wherein the cell temporal storage memory is used commonly in the quality of service class.

According to a sixth aspect of the present invention, in the third aspect, there is provided an ATM switching system, wherein the cell temporal storage memory is a first-in first-out memory.

According to a seventh aspect of the present invention, there is provided an ATM link switching method which comprises the steps of, a step for dividing cell inputted from a circuit between an active system switch and a stand-by system switch by using an input selector, a step for executing control of system switching by a system switching controller which is provided for the active system switch and the stand-by system switch respectively, a step for storing temporarily therein the inputted cell in every service quality class or in every outgoing destination by a cell temporal storage device which is provided for the active system switch and the stand-by system switch respectively, a step for reading-out the cell with high delay priority successively to output from the respective cell temporal storage device under control of the system switching controller by a delay priority selector, and a step for outputting the cell of the delay priority selector to circuit by an output selector, wherein the ATM switching system causes output of the cell to be executed for the sake of the delay priority selector from the cell temporal storage device of active system after condition that there becomes none of the cell whose delay priority is higher than that of the cell stored in the active system according to read-out control of the cell from the cell temporal storage device of stand-by system on the occasion of the system switching.

According to an eighth aspect of the present invention, in the seventh aspect, there is provided an ATM link switching method, wherein the operating method of the cell temporal storage device comprises, a step for separating an input cell obtained from the input selector in every quality of service class by a quality of service demultiplexer, a step for storing the input cell obtained from the quality of service demultiplexer temporarily in every quality of service class by a cell temporal storage memory, a step for controlling writing of the input cell for the cell temporal storage memory by a write controller, a step for reading the input cell whose arrival time is the earliest arrival time among quality of service class on the occasion of reception the quality of service class information from the system switching controller by a read controller, and a step fro implementing instructions with regard to the write controller and the read controller that it causes the whole cells of the quality of service class to be abolished upon reception of the quality of service class information from the system switching controller abolition controller.

According to a ninth aspect of the present invention, in the seventh aspect, there is provided an ATM link switching method, wherein operating method of the system switching controller comprises a step for instructing read-out of the cell whose delay priority is the highest delay priority among the cells stored in the cell temporal storage device of self-system and/or another system by a cell management part, a step for controlling the delay priority selector so as to select the highest delay priority cell from either self-system cell temporal storage device or another system cell temporal storage device by a selector controller, a step for implementing coordination so that it causes a cell of delay class to be stored in the self-system cell temporal storage device and the another system cell temporal storage device, and that it causes read-out of the cell of delay class to be implemented by an another system communication part, and a step for instructing abolition of the cell of lower class of cell abolition priority with regard to the cell temporal storage device after an elapsed fixed time from commencement of the system switching by a timer.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

Figure 3:
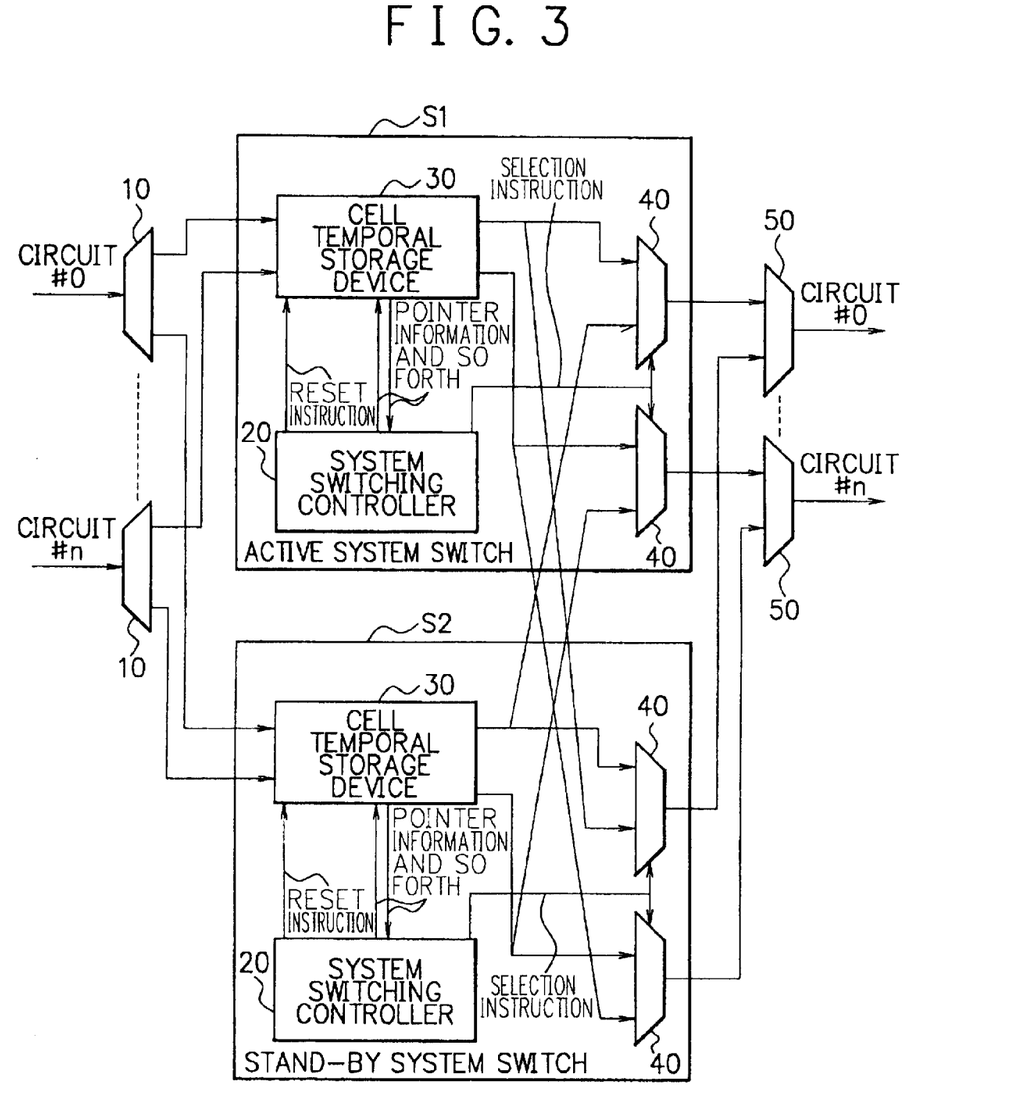
FIG. 3 is a block diagram showing an ATM switching system according to one embodiment of the present invention.

A preferred embodiment of the present invention will now be described in detail in accordance with the accompanying drawings. FIG. 3 is a block diagram showing an ATM switching system according to one embodiment of the present invention. In FIG. 3, the ATM switching system comprises an input selector 10 for dividing the cell inputted from a circuit between an active system switch S1 and stand-by system switch S2, a system switching controller 20 for implementing control on the occasion of system switching while being provided for the active system switch S1 and the stand-by system switch S2 of respective systems, a cell temporal storage device 30 for storing temporarily an input cell therein inputted through the input selector 10 in every delay class, a delay priority selector 40 for selecting either the active system switch or the stand-by system switch from which it causes the cell of the certain delay priority class to be outputted, and an output selector 50 for outputting the cell from the active system switch S1 operating as a current active system switch or the stand-by system switch.

Figure 4:
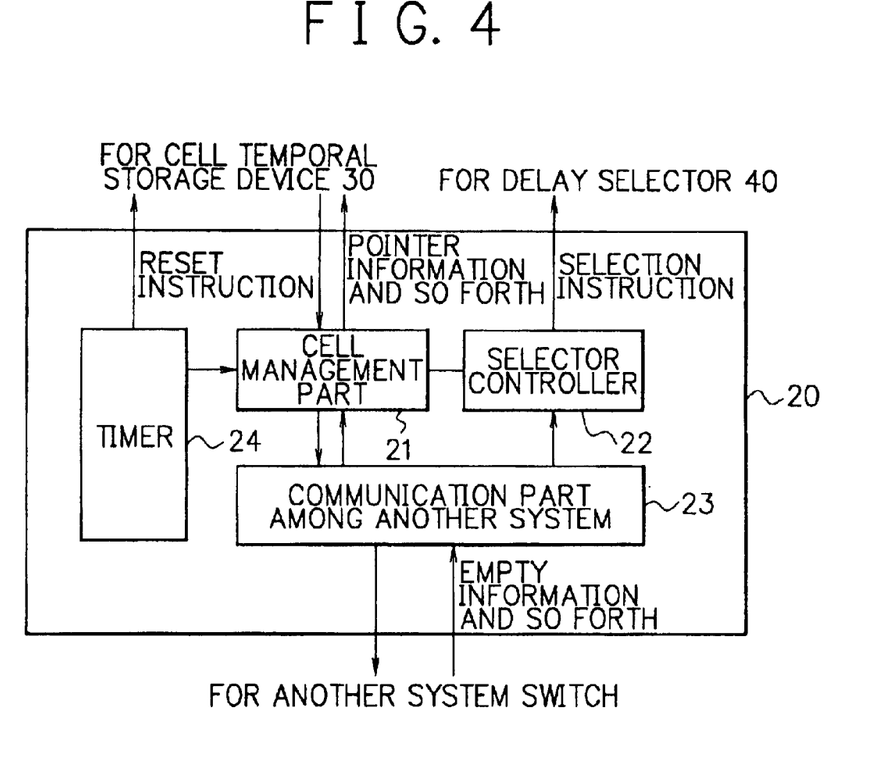
FIG. 4 is a block diagram showing detail of system switching controller in FIG. 3.

FIG. 4 is a block diagram showing detail of the system switching controller 20 shown in FIG. 3. In FIG. 4, the system switching controller 20 comprises a cell managing part 21 for outputting output instruction while waiting cell information stored in the cell temporal storage device 30, a selector controller 22 for controlling selection that it causes the cell to be outputted from which cell temporal storage devices 30, a communication part among another system 23 for executing mediation so that it causes read-out of the cell for the sake of which delay class to be implemented from between both cell temporal storage devices 30 in which respective cells of delay class are stored, and a timer for instructing abolition of the cell to the cell temporal storage device, after a fixed time elapsing from commencement of system switching.

Figure 5:
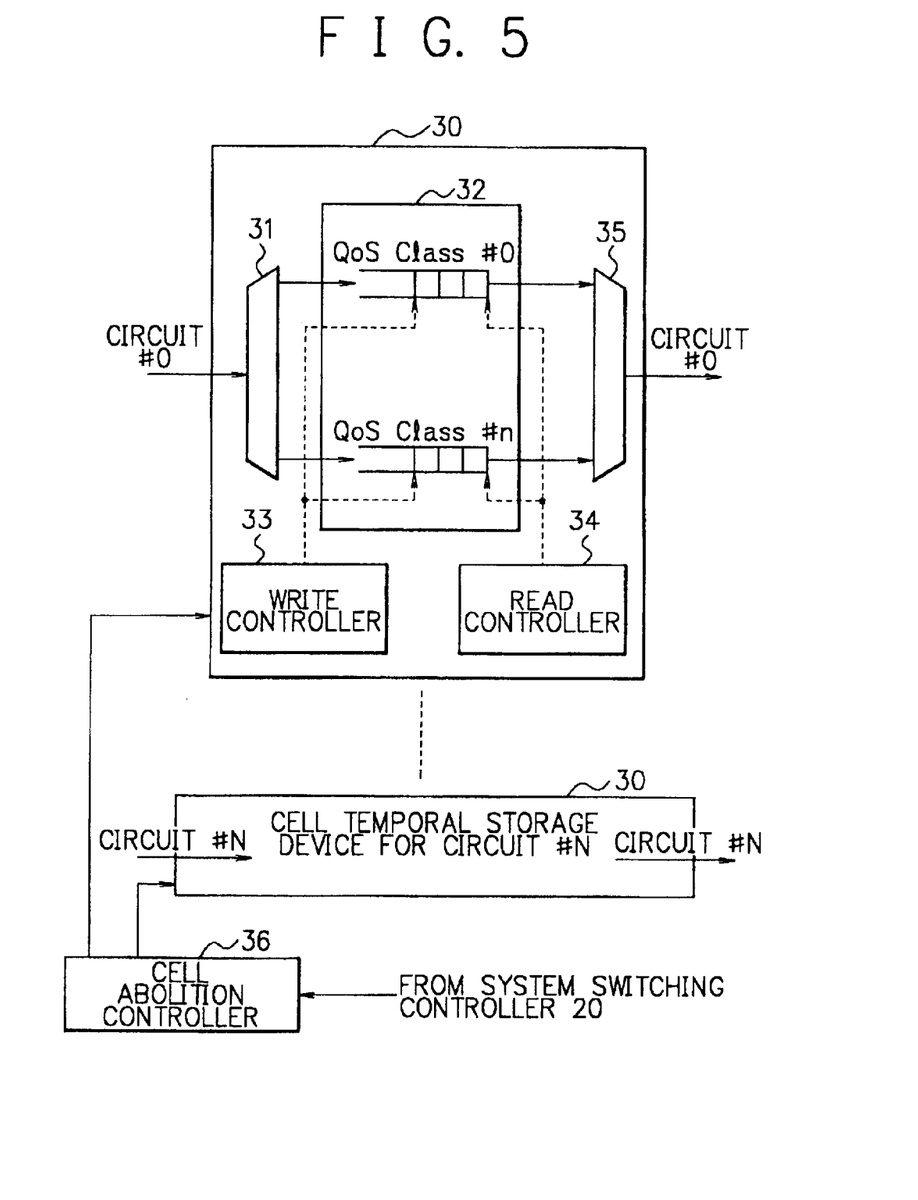
FIG. 5 is a block diagram showing detail of a cell temporary storage device in FIG. 3.

Furthermore, FIG. 5 is a block diagram showing details of the cell temporal storage device 30 shown in FIG. 3. In FIG. 5, a demultiplexer (DEMUX) 31 separates the cell in every respective "QoS" (Quality of Service) class. A cell temporal storage memory 32 stores the cell therein temporarily in every respective "QoS" class. A write controller 33 manages write address of the cell. A read controller 34 manages readout address of the cell. A "QoS" multiplexer (MUX). 35 multiplexes an output cell in every respective "QoS" class. A cell abolition controller 36 executes cell abolition according to cell abolition instruction from the system switching controller 20.

It is possible to classify the form of the ATM switch roughly according to a position relationship between the cell temporal storage device 30 shown in FIG. 3 and the ATM switch executing cell switching processing. The from of the ATM switch is capable of being classified roughly into an input buffer type ATM switch, an output buffer type ATM switch, and input/output buffer type ATM switch, and shared buffer type ATM switch. This is well known by those skilled in the art. Further, this is not related to the present invention directly, thus the position of the ATM switch is omitted.

Next, there will be explained the operation of the invention. Firstly, on the supposition that. In the normal operation, the input cell passes through only an active system device, and there is no inflow/storage of the cell for a stand-by system device. The cell is inputted from a circuit. The input selector 10 transmits the cell to the active system (current operation system) switch S1. The transmitted cell is divided in every "QoS" class. The divided cell is stored in the cell temporal storage device 30 in every "QoS" class. Subsequently, the system switching controller 20 executes an instruction that it causes the cell with high delay priority to be read while giving it priority from among the cells stored for the cell temporal storage device 30. The cell is read-out in order of delay priority. Consequently, the cell with the highest delay priority is read-out first. Thus, the cell is read-out in every delay priority class. The respective cells in accordance with the delay priority pass through the delay priority selector 40. The output selector 50 causes the cell to pass through current active system side to output to the circuit. The cell passes through the current active system side before being outputted to the circuit.

Further, the system switching controller 20 operates as follows. At present time, the cell is stored in the cell temporal storage device 30. The cell of the respective delay classes is stored therein with respective quantities. The information of respective quantities is noticed to the cell management part 21. The information is that the respective delay classes store therein the quantities of the cell. The quantities of the cell in every respective delay class are sent to the cell management part 21. The cell management part 21 receives cell storage condition of the cell temporal storage device 30 of another system through the communication part among another system 23. The cell management part 21 transmits information of self-system. Furthermore, the cell management part 21 instructs read-out of the cell with the highest delay priority from among the cells stored in both the self-system and another system. If the cell exists in the self-system, the cell management part 21 executes read-out instruction for the cell temporal storage device 30 of the self-system. The cell management part 21 executes instruction to the selector controller 22 so as to read-out the cell concerned from the self-system too. Moreover, if the cell exists in another system, the cell management part 21 executes read-out instruction for the cell temporal storage device 30 of another system through the communication part among another system 23. The cell management part 21 executes instruction to the selector controller 22 so as to read-out the cell concerned from another system too.

Moreover, the timer 24 executes abolition instruction of the cell to the cell temporal storage device 30 of the self-system. The abolition instruction of the cell is implemented in every respective "QoS" class. The abolition instruction according to the timer 24 is executed after elapsing times set beforehand, with start of system switching as trigger. Thus, it causes the cell of lower class of cell abolition priority to be abolished with respect to the cells stored in the cell temporal storage device 30 of the self-system.

Moreover, the cell temporal storage device 30 of FIG. 5 operates as follows. Firstly, the cell temporal storage device 30 inputs therein the cell. The "QoS" demultiplexer 31 detects "QoS" class of the cell. The "QoS" demultiplexer 31 transmits the cell for the different cell temporal storage memory 32 in every "QoS" class. The cell temporal storage memory 32 causes the received cell to be stored in address indicated by the write controller 33. On the other hand, when the read controller 34 receives a "QoS" class information from the system switching controller 20, the read controller 34 executes a read-out instruction of the cell having the earliest arrival time among the "QoS" classes. Furthermore, the cell abolition controller 36 receives abolition "QoS" class information from the system switching controller 20. On this occasion, the cell abolition controller 36 executes instruction causing the whole cells to be abolished with respect to the "QoS" class to the write controller 33 and the read controller 34.

In FIG. 5, if it causes the cell temporal memory 32 to be used jointly not 'in every respective "QoS" classes' but 'respective "QoS" classes', it becomes possible to reduce hardware quantity. Further, if it causes the cell temporal storage memory 32 to be constituted using First-In First-Out (FIFO) memory, it is capable of simplifying hardware of the write controller 33 and the read controller 34.

Next, a sequence of operation on the occasion of system switching will be explained in detail. Firstly, in the normal operation, on the supposition that the cell with low delay priority is stored in the cell temporal storage device 30 of the active system at the time of occurrence of system switching because the input cell passes through only inside of the active system device. In this condition, on the supposition that the cell flows therein, whose delay priority is higher than that of the cell stored in the cell temporal storage device 30 of the active system, and that it causes the system switching of the switch to be executed. The input selector 10 is switched. The input cell commences transmission of the cell for the switch S2 of the stand-by system (subsequent operation system). Further, the output selector 50 commences output from the stand-by system too.

The cell with low delay priority is stored in the cell temporal storage device 30 of the active system of the current operation system. The cell with higher delay priority than that of the above cell is stored successively in the cell temporal storage device 30 of the stand-by system of subsequent operation system. The system switching controller 20 causes the timer 24 to be triggered, before implementing management of both of the cell temporal storage device 30 of the active system and the cell temporal storage device 30 of the stand-by system. The system switching controller 20 executes read-out of the cell whose delay priority is high between both devices. Namely, in this case, firstly the read-out of the cell is implemented from the cell temporal storage device 30 of this stand-by system of the subsequent operation system. The cell whose delay priority is higher than that of the cell stored in the cell temporal storage device 30 of active system decreases at the cell temporal storage device 30 of the stand-by system. It causes a cell output operation to be executed from the cell temporal storage device 30 of the active system at the time when there becomes none storage of the cell whose delay priority is higher than that of the cell stored in the cell temporal storage device of the active system. The delay priority selector 40 executes selection in accordance with control of the system switching controller 20. The selection is implemented whether an output from the active system device is selected or an output from the stand-by system device is selected, in every respective delay classes. Either the output from the active system or the output of the stand-by system is transmitted to the output selector 50.

On the other hand, the cell with low delay priority is stored in the cell temporal storage device 30 of the active system. In this condition, when the timer expires, the system switching controller 20 implements abolition instruction of the cell of the low class of the abolition priority stored within the cell temporal storage device 30 of the active system. The system switching controller 20 instructs abolition with respect to the cell temporal storage device 30 of the active system as the current application system. As a result thereof, the cell with low abolition priority is abolished. Thus, it is capable of providing a system which executes switching of the duplicate switch in short time while maintaining "QoS" of the cell according to the ATM switching system of the present invention.

Figure 6:
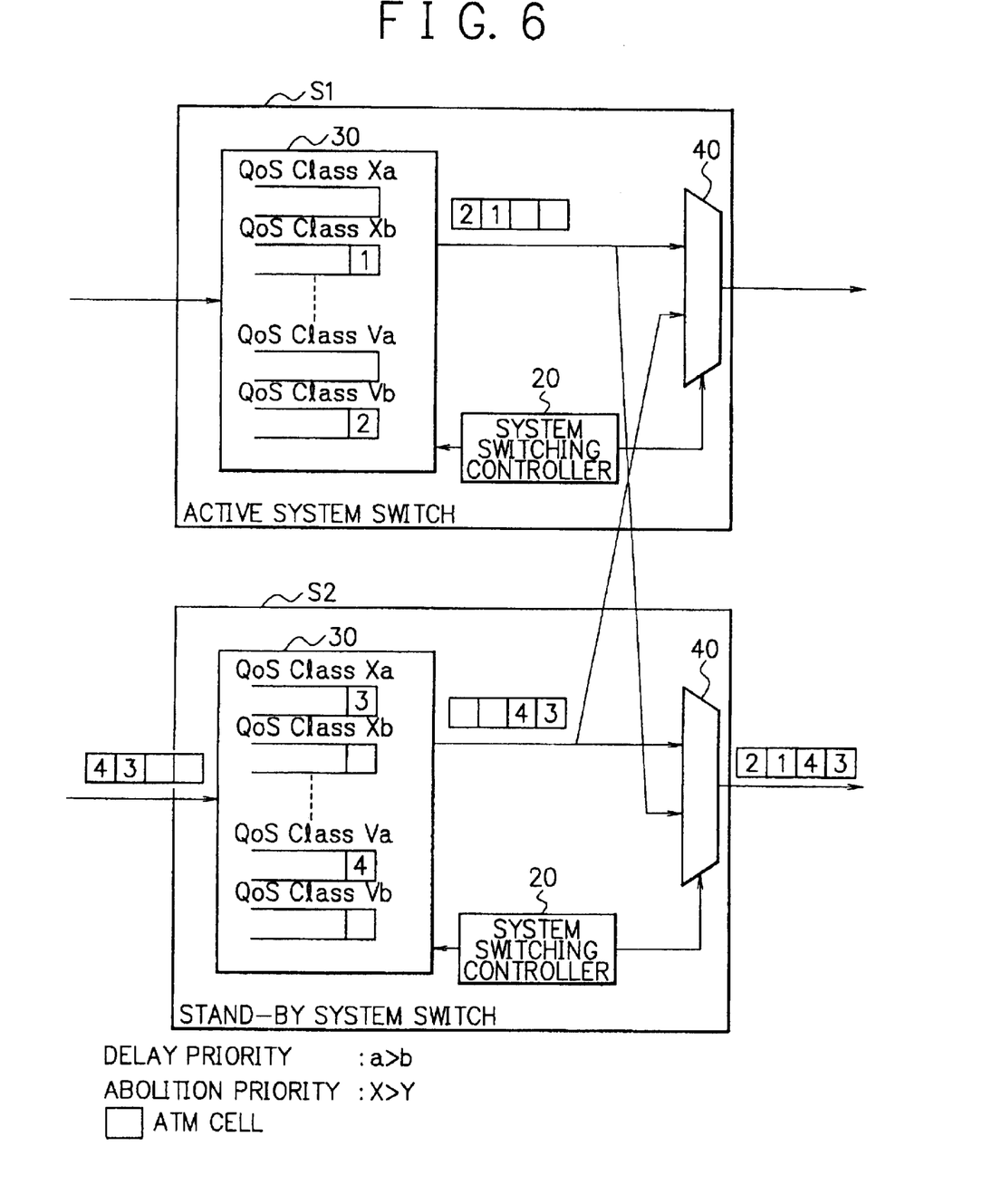
FIG. 6 is a block diagram of the ATM switching system for explaining operation of the invention concretely.

FIG. 6 is a block diagram showing operation of this invention in more detail. As mentioned above, the cell temporal storage device 30 of the active system stores therein the cell (1) with low delay priority and high abolition priority and the cell (2) with low delay priority and low abolition priority. In this condition, the system switching occurs. Subsequently, when the cells (3), and (4) whose delay priority are high flow therein, the cell is outputted in order of (3), (4), (1), and (2). Because in this invention, delay priority control is executed while managing together both the cell temporal storage device 30 of the active system and the cell temporal storage device 30 of the stand-by system, it is capable of maintaining "QoS" even when the system is switched.

Figure 7:
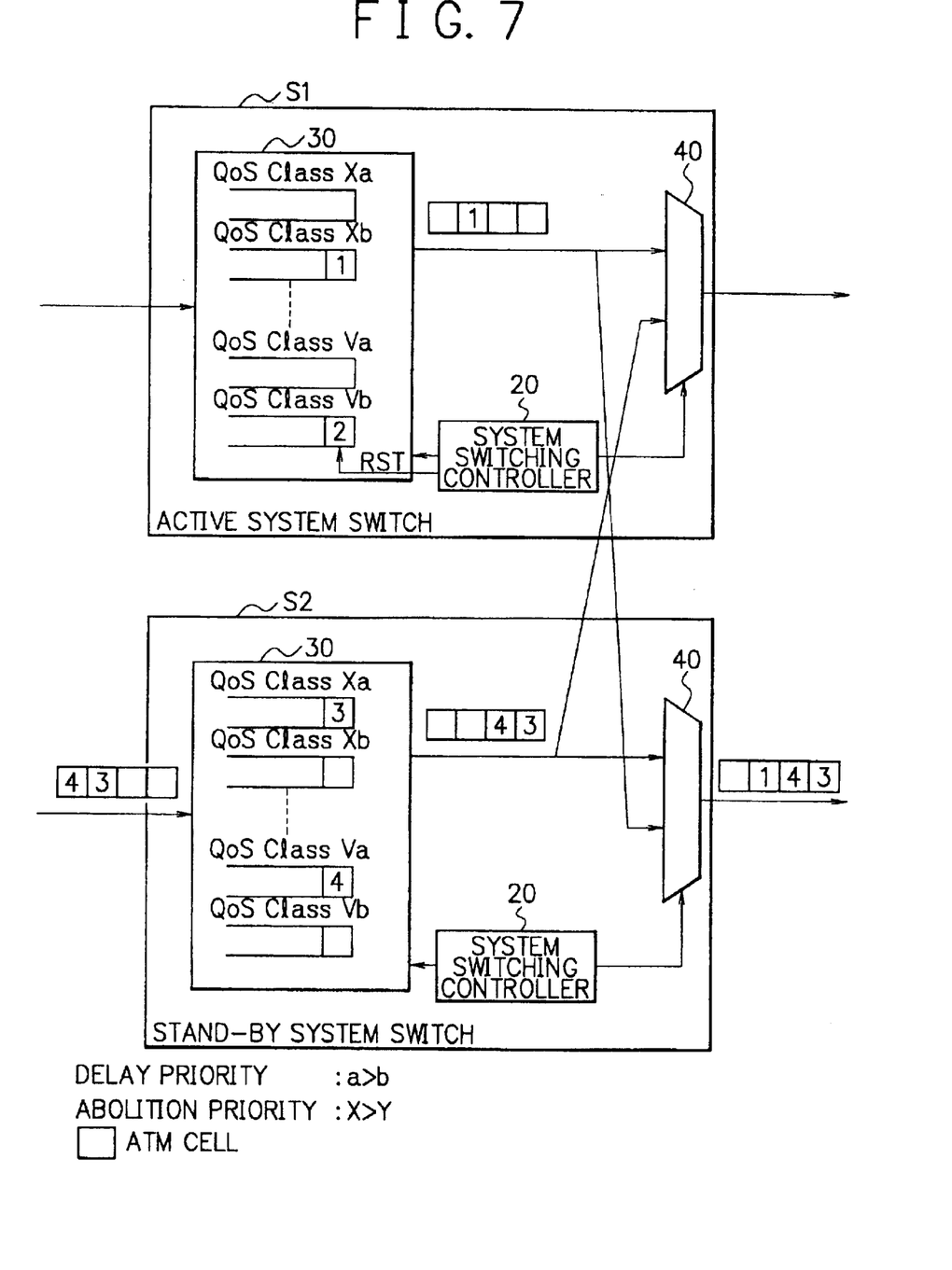
FIG. 7 is a block diagram of the ATM switching system for explaining operation in the case where time out occurs in this invention.

FIG. 7 is a block diagram showing operation in the case where timeout occurs during operation of FIG. 6. As mentioned above, the cell temporal storage device 30 of the active system stores therein the cell (1) with low delay priority and high abolition priority and the cell (2) with low delay priority and low abolition priority. In such the condition, the system switching occurs. Subsequently, when the cells (3), and (4) whose delay priority are high flow therein, the cell is outputted in order of (3), (4), (1), and (2). Because in this invention, it causes delay priority control to be executed while managing together both of the cell temporal storage device 30 of the active system and the cell temporal storage device 30 of the stand-by system. Further, it enables the cell (2) with low abolition priority to be abolished by the timer, the output becomes (3), (4), and (1). Thus it is capable of completing the system switching within the fixed time and maintaining "QoS".

As mentioned above, according to the present invention, the delay priority selector causes both the active system and the stand-by system to output the cell whose delay priority is high during execution of the system switching. For that reason, it is capable of implementing switching of the duplicate switches while maintaining "QoS" even though the system is switched. Further, the timer causes only the cell with low abolition priority to be abolished selectively, the effect is that it is capable of being completed quickly within the fixed time.

While preferred embodiments of the invention have been described using specific terms, the description has been for illustrative purposes only, and it is to be understood that changes and variations may be made without departing from the spirit or scope of the following claims.

What is claimed is:

1. An ATM (Asynchronous Transfer Mode) switching system comprising:

an input selector for dividing cells inputted from a circuit between an active system switch and a stand-by system switch;

a system switching controller which is provided for respective said active system switch and said stand-by system switch respectively in order to execute control of system switching;

a cell temporal storage device which is provided for respective said active system switch and said stand-by system switch respectively for storing temporarily therein said inputted cell in every service quality class or in every outgoing destination;

a delay priority selector for reading-out the cell with high delay priority successively to output from said respective sell temporal storage device under control of said system switching controller; and an output selector for outputting the cell of said delay priority selector, wherein said ATM switching system causes output of the cell to be execute according to said delay priority selector from the cell temporal storage device of active system when there is no cell whose delay priority is higher than that of the cell stored in said active system according to read-out control of the cell from the cell temporal storage device of stand-by system on the occasion of said system switching, wherein the ATM switching system causes the cell of class of low abolition priority stored in the cell temporal storage device of the active system to be abolished after an elapsed fixed time from commencement of system switching in the condition that the cell with low delay priority is stored in said cell temporal storage device of the active system.

2. An ATM (Asynchronous Transfer Mode) switching system comprising:

an input selector for dividing cells inputted from a circuit between an active system switch and a stand-by system switch;

a system switching controller which is provided for respective said active system switch and said stand-by system switch respectively in order to execute control of system switching;

a cell temporal storage device which is provided for respective said active system switch and said stand-by system switch respectively for storing temporarily therein said inputted cell in every service quality class or in every outgoing destination;

a delay priority selector for reading-out the cell with high delay priority successively to output from said respective sell temporal storage device under control of said system switching controller; and an output selector for outputting the cell of said delay priority selector, wherein said ATM switching system causes output of the cell to be execute according to said delay priority selector from the cell temporal storage device of active system when there is no cell whose delay priority is higher than that of the cell stored in said active system according to read-out control of the cell from the cell temporal storage device of stand-by system on the occasion of said system switching, and wherein said cell temporal storage device comprises:
a quality of service demultiplexer for separating an input cell obtained from said input selector in every quality of service class;
a cell temporal storage memory for storing the input cell obtained from said quality of service demultiplexer temporarily in every quality of service class;
a write controller for controlling writing of the input cell for said cell temporal storage memory;
a read controller for reading the input cell whose arrival time is the earliest arrival time among quality of service class on the occasion of reception of the quality of service class information from said system switching controller; and
a cell abolition controller for implementing instructions with regard to said write controller and the read controller so that it causes cells of the quality of service class to be abolished upon reception of the quality of service class information from said system switching controller.

3. An ATM switching system as claimed in claim 2, wherein said cell temporal storage memory is used commonly in the quality of service class.

4. An ATM switching system as claimed in claim 2, wherein said cell temporal storage memory is a first-in first-out memory.

5. An ATM (Asynchronous Transfer Mode) switching system comprising:

an input selector for dividing cells inputted from a circuit between an active system switch and a stand-by system switch;

a system switching controller which is provided for respective said active system switch and said stand-by system switch respectively in order to execute control of system switching;

a cell temporal storage device which is provided for respective said active system switch and said stand-by system switch respectively for storing temporarily therein said inputted cell in every service quality class or in every outgoing destination;

a delay priority selector for reading-out the cell with high delay priority successively to output from said respective sell temporal storage device under control of said system switching controller; and an output selector for outputting the cell of said delay priority selector, wherein said ATM switching system causes output of the cell to be execute according to said delay priority selector from the cell temporal storage device of active system when there is no cell whose delay priority is hither than that of the cell stored in said active system according to read-out control of the cell from the cell temporal storage device of stand-by system on the occasion of said system switching, and wherein said system switching controller comprises:
a cell management part for instructing read-out of the cell whose delay priority is the highest delay priority among the cells stored in the cell temporal storage device of self-system and/or another system;
a selector controller for controlling said delay priority selector so as to select the cell from either self-system cell temporal storage device or another system cell temporal storage device;
an another system communication part for implementing coordination so that it causes a cell of delay class to be stored in said self-system cell temporal storage device and said another system cell temporal storage device, and that it causes read-out of the cell of delay class to be implemented; and
a timer for instructing abolition of the cell of lower class of cell abolition priority with regard to said cell temporal storage device after an elapsed fixed time from commencement of said system switching.

6. An ATM link switching method comprising the steps of:

dividing cells inputted from a circuit between an active system switch and a stand-by system switch by using an input selector;

executing control of system switching by a system switching controller which is provided for respective said active system switch and said stand-by system switch respectively;

storing temporarily therein said inputted cell in every service quality class or in every outgoing destination by a cell temporal storage device which is provided for respective said active system switch and said stand-by system switch respectively;

reading-out the cell with high delay priority successively to output from said respective cell temporal storage device under control of said system switching controller by a delay priority selector; and outputting the cell of said delay priority selector to circuit by an output selector, wherein said ATM switching system causes output of the cell to be executed according to said delay priority selector from the cell temporal storage device of active system when there is no cell whose delay priority is higher than that of the cell stored in said active system according to read-out control of the cell from the cell temporal storage device of stand-by system on the occasion of said system switching, and wherein an operating method of said cell temporal storage device comprises the steps of:

separating an input cell obtained from said input selector in every quality of service class by a quality of service demultiplexer;

storing the input cell obtained from said quality of service demultiplexer temporarily in every quality of service class by a cell temporal storage memory;

controlling writing of the input cell for said cell temporal storage memory by a write controller;

reading the input cell whose arrival time is the earliest arrival time among quality of service class on the occasion of reception of the quality of service class information from said system switching controller by a read controller; and implementing instructions with regard to said write controller and the read controller so that it causes cells of the quality of service class to be abolished upon reception of the quality of service class information from said system switching controller by a cell abolition controller.

7. An ATM link switching method comprising the steps of:

dividing cells inputted from a circuit between an active system switch and a stand-by system switch by using an input selector;

executing control of system switching by a system switching controller which is provided for respective said active system switch and said stand-by system switch respectively;

storing temporarily therein said inputted cell in every service quality class or in every outgoing destination by a cell temporal storage device which is provided for respective said active system switch and said stand-by system switch respectively;

reading-out the cell with high delay priority successively to output from said respective cell temporal storage device under control of said system switching controller by a delay priority selector; and outputting the cell of said delay priority selector to circuit by an output selector, wherein said ATM switching system causes output of the cell to be executed according to said delay priority selector from the cell temporal storage device of active system when there is no cell whose delay priority is higher than that of the cell stored in said active system according to read-out control of the cell from the cell temporal storage device of stand-by system on the occasion of said system switching, and wherein an operating method of said system switching controller comprises the steps of:

instructing read-out of the cell whose delay priority is the highest delay priority among the cells stored in the cell temporal storage device of self-system and/or another system by a cell management part;

controlling said delay priority selector so as to select the highest-delay priority cell from either self-system cell temporal storage device or another system cell temporal storage device by a selector controller;

implementing coordination so that it causes a cell of delay class to be stored in said self-system cell temporal storage device and said another system cell temporal storage device, and that it causes read-out of the cell of delay class to be implemented by an another system communication part; and instructing abolition of the cell of lower class of cell abolition priority with regard to said cell temporal storage device after an elapsed fixed time from commencement of said system switching by a timer.

* * * * *